US012157365B2

(12) United States Patent
Van Dingenen

(10) Patent No.: US 12,157,365 B2
(45) Date of Patent: Dec. 3, 2024

(54) ELECTRIC POWERSHIFTING TRANSMISSION WITH POWER TAKE-OFF

(71) Applicant: Dana Belgium N.V., Flanders (BE)

(72) Inventor: Joachim Van Dingenen, Drongen (BE)

(73) Assignee: DANA BELGIUM N.V., Bruges (BE)

(*) Notice: Subject to any disclaimer, the term of this patent is extended or adjusted under 35 U.S.C. 154(b) by 55 days.

(21) Appl. No.: 18/054,678

(22) Filed: Nov. 11, 2022

(65) Prior Publication Data

US 2024/0157787 A1    May 16, 2024

(51) Int. Cl.
*B60K 17/28* (2006.01)
*B60K 25/06* (2006.01)
*F16D 48/06* (2006.01)
*F16H 3/00* (2006.01)

(52) U.S. Cl.
CPC .............. *B60K 17/28* (2013.01); *B60K 25/06* (2013.01); *F16H 3/006* (2013.01); *F16D 48/066* (2013.01); *F16D 2500/10437* (2013.01); *F16H 2003/008* (2013.01)

(58) Field of Classification Search
CPC .......... B60K 17/28; B60K 1/02; B60K 6/387; B60K 6/36; B60K 25/06; B60K 17/02; B60K 2006/4808; B60K 17/04; F16H 2061/0422; F16H 2200/2094

USPC ................................................ 74/15.86, 340
See application file for complete search history.

(56) References Cited

U.S. PATENT DOCUMENTS

| | | | | |
|---|---|---|---|---|
| 7,363,122 | B2* | 4/2008 | Bischoff | B60L 50/16 701/22 |
| 8,075,435 | B2* | 12/2011 | Si | B60K 6/547 475/5 |
| 8,579,751 | B2* | 11/2013 | Phillips | B60W 10/08 475/221 |
| 2017/0203646 | A1* | 7/2017 | Mueller | B60W 10/111 |
| 2021/0129829 | A1* | 5/2021 | McKinzie | F16H 47/02 |
| 2021/0362593 | A1* | 11/2021 | Van Dingenen | B60K 6/365 |
| 2021/0364065 | A1* | 11/2021 | Versini | B60K 6/365 |
| 2021/0379978 | A1* | 12/2021 | Van Dingenen | B60K 25/06 |
| 2023/0191897 | A1* | 6/2023 | Rulfi Fertilio | B60K 6/448 475/5 |

* cited by examiner

*Primary Examiner* — Paul N Dickson
*Assistant Examiner* — Caitlin Anne Miller
(74) *Attorney, Agent, or Firm* — McCoy Russell LLP

(57) ABSTRACT

A method and system for operating a transmission that includes a power take off is described. The transmission selectively delivers mechanical power to the power take off from one of two electric traction motors via selective engagement of either a first or a second power take off clutch based on drive mode. The transmission also allows for powershifting between a first and second operating gear.

19 Claims, 9 Drawing Sheets

| State | 1st gear, no PTO, 2 EMs to output | 1st gear, PTO, 1 EM to output | 1st gear, PTO, 2 EMs to output | 2nd gear, PTO, 2 EMs to output | 1st gear, PTO, 1 EM to output reverse | 1st gear, PTO, 2 EMs to output reverse | 2nd gear, PTO, 2 EMs to output reverse |
|---|---|---|---|---|---|---|---|
| EM1 1st clutch (248) | closed | open | closed | open | open | closed | open |
| EM1 2nd clutch (252) | open | open | open | closed | open | open | closed |
| EM1 PTO clutch (274) | open | closed | closed | closed | closed | open | open |
| EM2 1st clutch (228) | closed | closed | closed | open | closed | closed | open |
| EM2 2nd clutch (232) | open | open | open | closed | open | open | closed |
| EM2 PTO clutch (292) | open | open | open | open | open | closed | closed |
| EM1 speed | low | high | high | low | high | high-reverse | low-reverse |
| EM2 speed | low | low | high | low | low-reverse | high-reverse | low-reverse |
| PTO speed | zero | high | high | low | high | high | low |

FIG. 3A

| State | off | transfer state | 1st gear w/o PTO |
|---|---|---|---|
| EM1 speed | 0 | 0 | low |
| EM1 torque | 0 | 0 | >0 |
| EM1 1st clutch | open | closed | closed |
| EM1 2nd clutch | open | open | open |
| EM2 speed | 0 | 0 | low |
| EM2 torque | 0 | 0 | >0 |
| EM2 1st clutch | open | closed | closed |
| EM2 2nd clutch | open | open | open |
| EM1 PTO clutch | open | open | open |
| EM2 PTO clutch | open | open | open |
| PTO speed | 0 | 0 | 0 |

FIG. 3B

| State | 1st gear w/o PTO | transfer state | transfer state | transfer state | transfer state | 1st gear w/ PTO 1 EM to output |
|---|---|---|---|---|---|---|
| EM1 speed | low | low | low | 0 | 0 | high |
| EM1 torque | >0 | 0 | 0 | 0 | 0 | >0 |
| EM1 1st clutch | closed | closed | open | open | open | open |
| EM1 2nd clutch | open | open | open | open | open | open |
| EM2 speed | low | low | low | low | low | low |
| EM2 torque | >0 | >0 | >0 | >0 | >0 | >0 |
| EM2 1st clutch | closed | closed | closed | closed | closed | closed |
| EM2 2nd clutch | open | open | open | open | open | open |
| EM1 PTO clutch | open | open | open | open | closed | closed |
| EM2 PTO clutch | open | open | open | open | open | open |
| PTO speed | 0 | 0 | 0 | 0 | 0 | high |

FIG. 3C

| State | 1st gear w/ PTO 1 EM to output | transfer state | 1st gear w/ PTO 2 EMs to output |
|---|---|---|---|
| EM1 speed | high | high | high |
| EM1 torque | >0 | >0 | >0 |
| EM1 1st clutch | open | open | closed |
| EM1 2nd clutch | open | open | open |
| EM2 speed | low | high | high |
| EM2 torque | >0 | >0 | >0 |
| EM2 1st clutch | closed | closed | closed |
| EM2 2nd clutch | open | open | open |
| EM1 PTO clutch | closed | closed | closed |
| EM2 PTO clutch | open | open | open |
| PTO speed | high | high | high |

FIG. 3D

| State | 1st gear w/ PTO 2 EMs to output | transfer state | transfer state | transfer state | transfer state | transfer state | transfer state | transfer state | transfer state | 2nd gear w/ PTO 2 EMs to output |
|---|---|---|---|---|---|---|---|---|---|---|
| EM1 speed | high | high | high | low | low | low | low | low | low | low |
| EM1 torque | >0 | 0 | 0 | 0 | 0 | increased | increased | increased | increased | >0 |
| EM1 1st clutch | closed | closed | open | open | open | open | open | open | open | open |
| EM1 2nd clutch | open | open | open | open | closed | closed | closed | closed | closed | closed |
| EM2 speed | high | high | high | high | high | high | high | low | low | low |
| EM2 torque | >0 | increased | increased | increased | increased | 0 | 0 | 0 | 0 | >0 |
| EM2 1st clutch | closed | closed | closed | closed | closed | closed | open | open | open | open |
| EM2 2nd clutch | open | open | open | open | open | open | open | open | closed | closed |
| EM1 PTO clutch | closed | closed | closed | closed | closed | closed | closed | closed | closed | closed |
| EM2 PTO clutch | open | open | open | open | open | open | open | open | open | open |
| PTO speed | high | high | high | high | high | high | high | low | low | low |

FIG. 3E

| State | 1st gear with PTO, 1 EM to output | 1st gear with PTO, 1 EM to output reverse |
|---|---|---|
| EM1 speed | high | high |
| EM1 torque | >0 | >0 |
| EM1 1st clutch | open | open |
| EM1 2nd clutch | open | open |
| EM2 speed | low | low - reverse |
| EM2 torque | >0 | >0 |
| EM2 1st clutch | closed | closed |
| EM2 2nd clutch | open | open |
| EM1 PTO clutch | closed | closed |
| EM2 PTO clutch | open | open |
| PTO speed | high | high |

FIG. 3F

| State | 1st gear with PTO 1 EM to output reverse | transfer state | transfer state | transfer state | transfer state | transfer state | transfer state | transfer state | 1st gear with PTO 2 EMs to output reverse |
|---|---|---|---|---|---|---|---|---|---|
| EM1 speed | high | low | low | low | low | low-reverse | low-reverse | low-reverse | high-reverse |
| EM1 torque | >0 | >0 | >0 | 0 | 0 | 0 | 0 | >0 | >0 |
| EM1 1st clutch | open | open | open | open | open | open | closed | closed | closed |
| EM1 2nd clutch | open | open | open | open | open | open | open | open | open |
| EM2 speed | low - reverse | low - reverse | low - reverse | low - reverse | low - reverse | low - reverse | low - reverse | low - reverse | high - reverse |
| EM2 torque | >0 | >0 | >0 | increased | increased | increased | increased | >0 | >0 |
| EM2 1st clutch | closed | closed | closed | closed | closed | closed | closed | closed | closed |
| EM2 2nd clutch | open | open | open | open | open | open | open | open | open |
| EM1 PTO clutch | closed | closed | closed | closed | open | open | open | open | open |
| EM2 PTO clutch | open | open | closed | closed | closed | closed | closed | closed | closed |
| PTO speed | high | low | low | low | low | low | low | low | high |

FIG. 3G

| State | 1st gear with PTO 2 EMs to output reverse | transfer state | transfer state | transfer state | transfer state | transfer state | transfer state | transfer state | transfer state | 2nd gear with PTO 2 EMs to output reverse |
|---|---|---|---|---|---|---|---|---|---|---|
| EM1 speed | high-reverse | high-reverse | high-reverse | low-reverse | low-reverse | low-reverse | low-reverse | low-reverse | low-reverse | low-reverse |
| EM1 torque | >0 | 0 | 0 | 0 | 0 | increased | increased | increased | increased | >0 |
| EM1 1st clutch | closed | closed | open | open | open | open | open | open | open | open |
| EM1 2nd clutch | open | open | open | open | closed | closed | closed | closed | closed | closed |
| EM2 speed | high - reverse | high - reverse | high - reverse | high - reverse | high - reverse | high - reverse | low - reverse | low - reverse | low - reverse | low - reverse |
| EM2 torque | >0 | increased | increas | increased | increased | 0 | 0 | 0 | 0 | >0 |
| EM2 1st clutch | closed | closed | closed | closed | closed | closed | open | open | open | open |
| EM2 2nd clutch | open | open | open | open | open | open | open | open | closed | closed |
| EM1 PTO clutch | open | open | open | open | open | open | open | open | open | open |
| EM2 PTO clutch | closed | closed | closed | closed | closed | closed | closed | closed | closed | closed |
| PTO speed | high | high | high | high | high | high | high | low | low | low |

FIG. 3H

ELECTRIC POWERSHIFTING TRANSMISSION WITH POWER TAKE-OFF

TECHNICAL FIELD

The present description relates generally to an electric powershifting transmission with power take-off.

BACKGROUND AND SUMMARY

A vehicle may include a transmission that includes a power take-off. The power take off may transfer torque from an engine to a device that is coupled to a transmission. A transmission power take-off may deliver power to a load other than vehicle wheels which adds the benefit of an additional load without requiring an additional motor. The speed of the power take-off is dependent upon the speed of the motor to which it is coupled. In this particular example, the power take-off output shaft may rotate at a speed matching the speed of the power take off input shaft. The input shaft of the power take-off may be coupled to a shaft of a transmission. However, the input shaft rotational speed is limited by the speed of the motor to which it is coupled. A power take-off such as a hydraulic pump necessitates a minimum speed that may be higher than the speed of an electric motor to which the power take off is coupled when in first gear at low speed. Additionally, the power take off necessitates a forward drive and therefore gear and clutch arrangements must be so to accommodate this.

The inventors herein have recognized the above-mentioned issues and have developed a transmission, comprising, a power take off that may be optionally coupled to either a first electric motor or a second electric motor based on the speed and drive mode of the motors. The transmission includes a plurality of shafts, gears, and clutches configured to deliver power to both an output via an output shaft and to a power take-off via a power take-off input shaft.

By having two optional gear sets, including clutches to engage the power take off with an electric motor, it may be possible to provide the technical result of being able to power the power take off when the electric motors are in either forward or reverse drive and at low speed in first gear. Additionally, by having two electric motors on the input side and a combined output torque available on the output side of the transmission, it is possible to drive the first and second electric motors independently from one another and depending on the respectively connected gear arrangements such that the efficiency of the dual-motor electrical transmission is maximized. Furthermore, the transmission according to the present disclosure enables powershifting which means that the combined output torque can be maintained during gear shifting. Consequently, it may be possible for the accessories to operate with greater efficiency.

The present description may provide several advantages. In particular, the approach herein includes a transmission with, optionally, two power take off gear sets and clutches that may be coupled to two separate electric motors in order to provide power to a power take off.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a table that indicates configurations of the clutches in the operating modes of the transmission system.

FIG. 3B shows a table indicating configurations of the clutches in an off mode and a first operating mode and transfer states therebetween.

FIG. 3C shows a table indicating configurations of the clutches in the first operating mode and a second operating mode and transfer states therebetween.

FIG. 3D shows a table indicating configurations of the clutches in the second operating mode and a third operating mode and transfer states therebetween.

FIG. 3E shows a table indicating configurations of the clutches in the third operating mode and a fourth operating mode and transfer states therebetween.

FIG. 3F shows a table indicating configurations of the clutches in the second operating mode and a fifth operating mode and transfer states therebetween.

FIG. 3G shows a table indicating configurations of the clutches in the fifth operating mode and a sixth operating mode and transfer states therebetween.

FIG. 3H shows a table indicating configurations of the clutches in the sixth operating mode and a seventh operating mode and transfer states therebetween.

DETAILED DESCRIPTION

Figure 1:
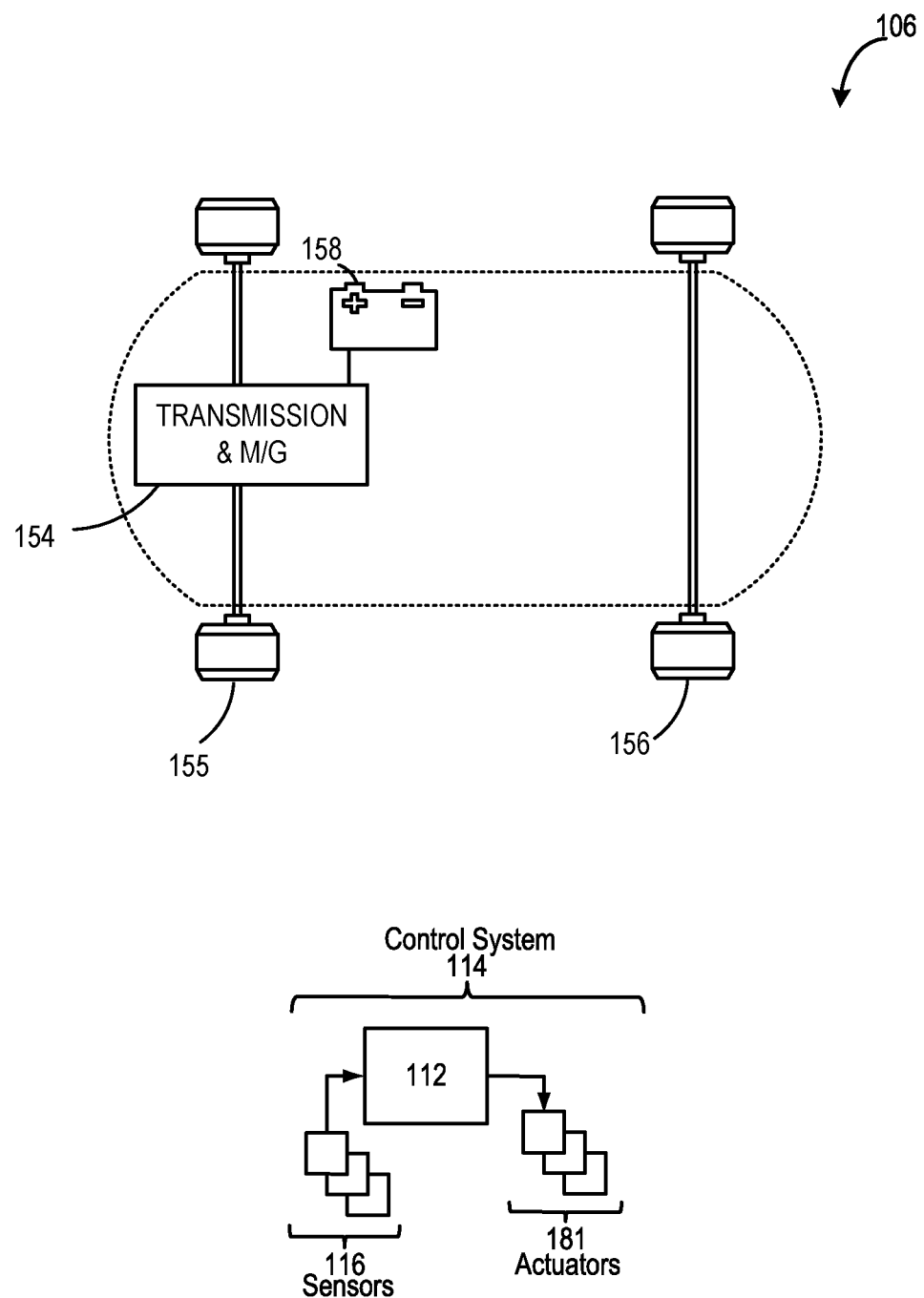
FIG. 1 shows a schematic of a car with a transmission, an electric motor, a battery, rear wheels, and front wheels. There is a control system including a controller with sensors and actuators.
Figure 2:
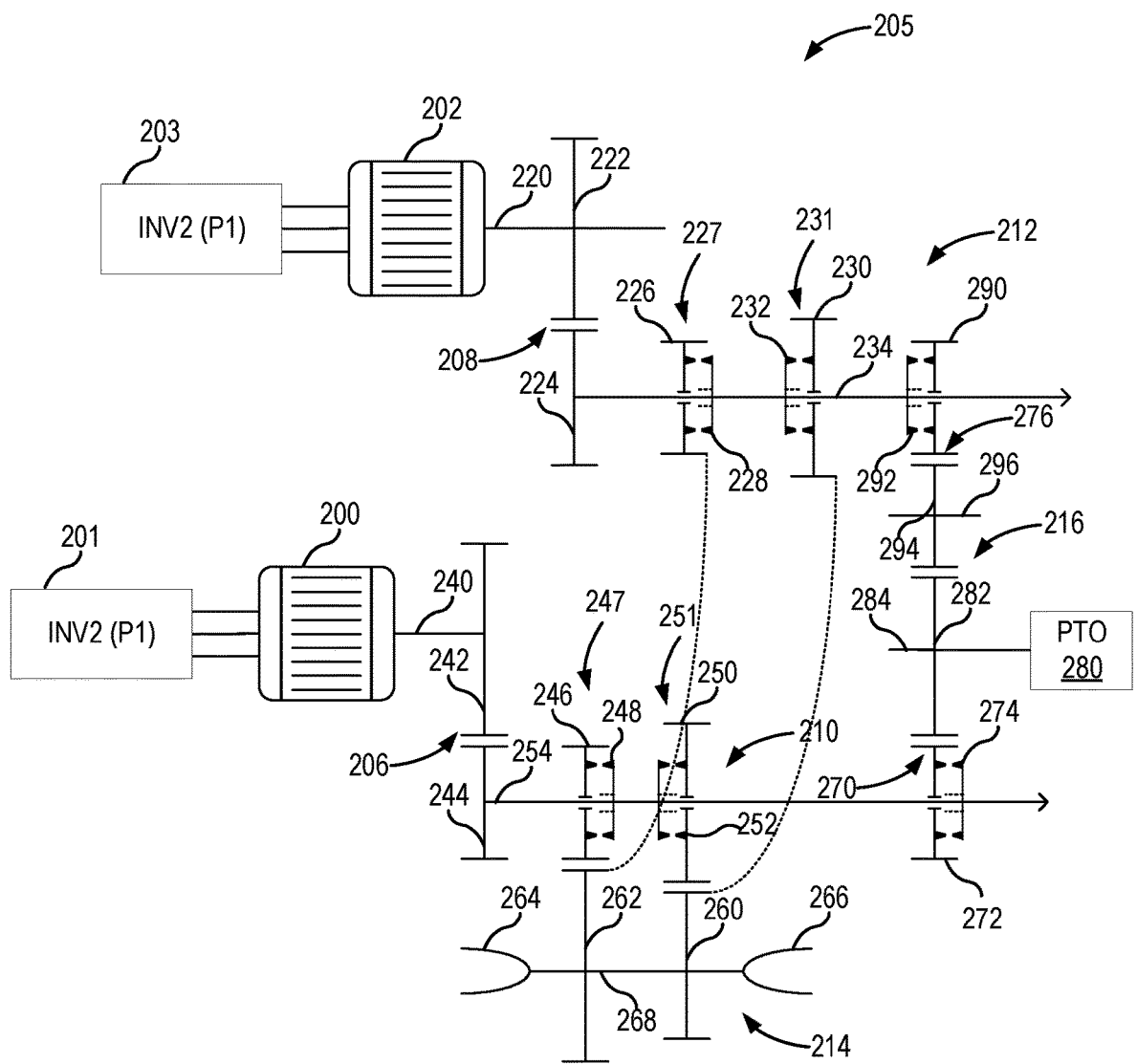
FIG. 2 shows schematically a transmission layout with a power take off.
Figure 5:
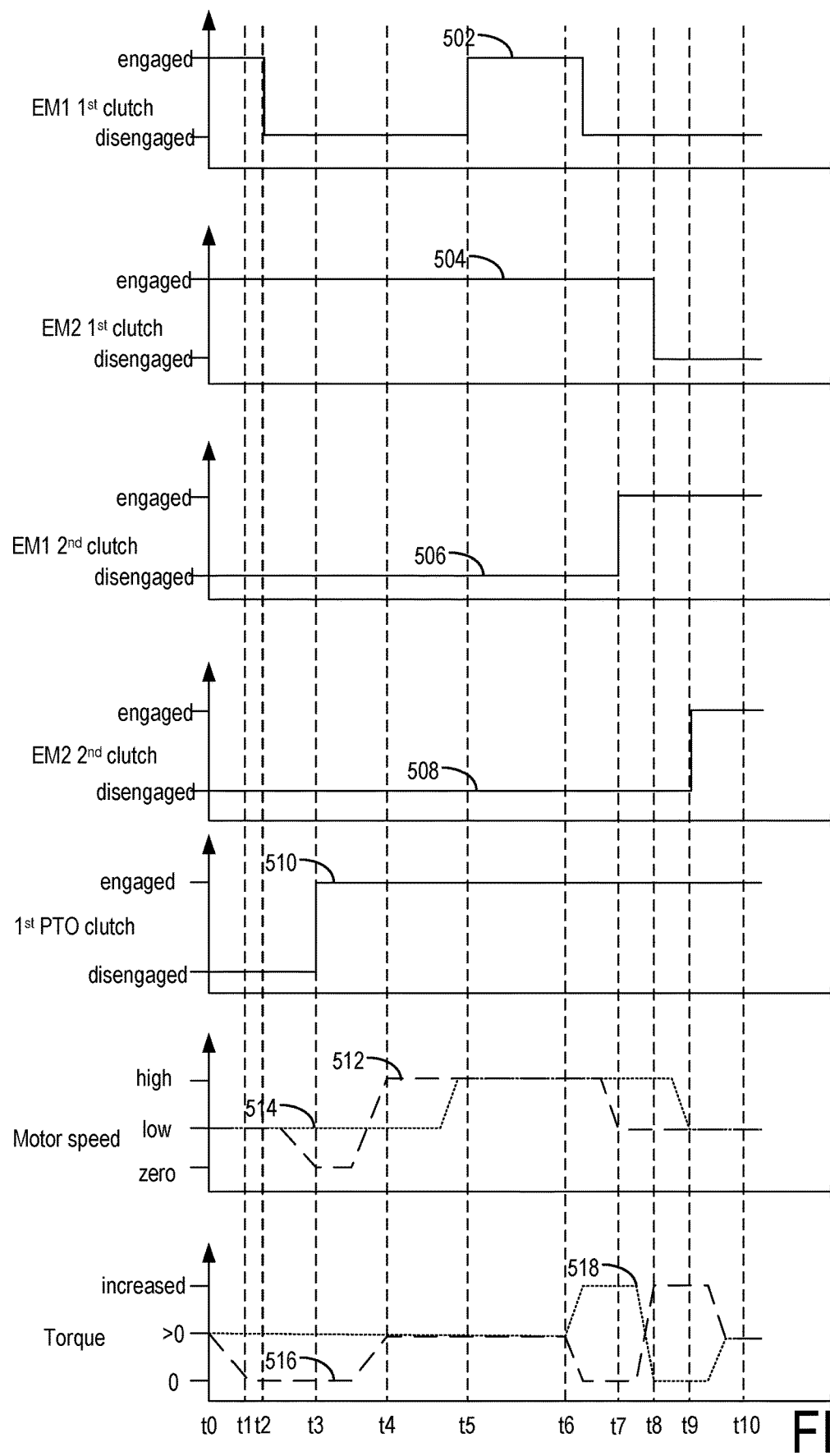
FIG. 5 is a timing diagram for a use-case transmission control strategy in forward drive mode.
Figure 6:
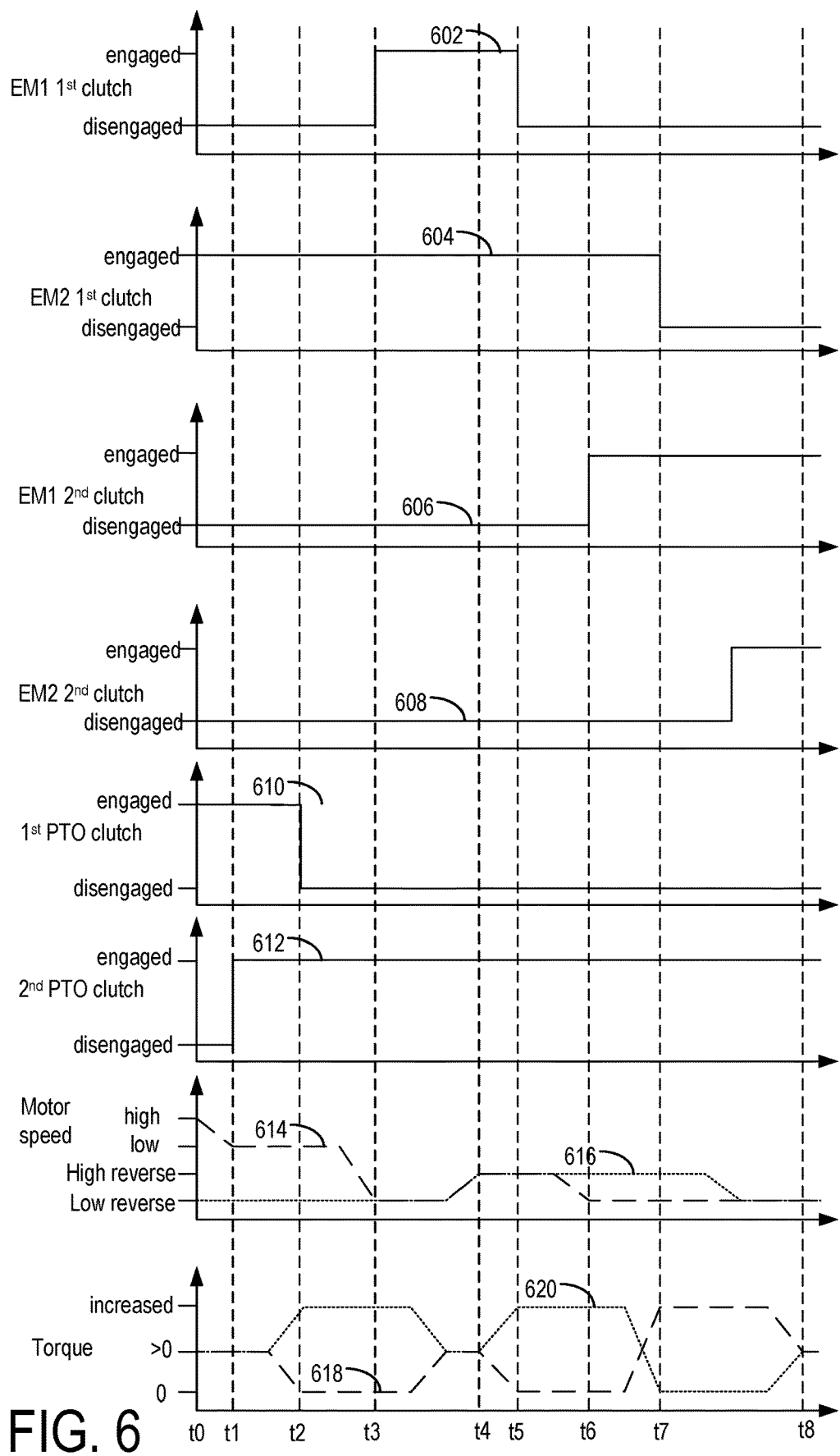
FIG. 6 is a timing diagram for a use-case transmission control strategy in reverse drive mode.

The following description relates to systems and methods for operating an electric drive transmission. The transmission may include a power take off (PTO) optionally couplable to two separate electric machines via respective PTO clutches. The PTO may be driven by an electric machine by selectively delivering mechanical power to the PTO via selective engagement of the PTO clutches based on drive mode, electric machine speed, and/or other vehicle operating conditions. The transmission may be included in the vehicle as shown in FIG. 1. The layout of the electric machines, the transmission, and the PTO, including respective shafts, gears, and clutches is shown in FIG. 2. Configurations for possible operating modes of the transmission are shown in a table in FIG. 3A and the possible operating modes and transfer states between operating modes are shown in tables in FIGS. 3B-3H. A method for operation of the transmission including selective engagement of clutches is presented in a flowchart in FIG. 4. Timing diagrams for a use-case operation of the transmission in forward drive are shown in FIG. 5 and timing diagrams for a use-case operation of the transmission in reverse drive are shown in FIG. 6.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows a schematic depiction of a vehicle system 106 that can derive propulsion power from an electric motor 154 (e.g., a drive motor). In one embodiment, electric motor 154 may be a traction motor. Electric motor 154 receives electrical power from a traction battery 158 to provide torque to rear vehicle wheels 155. Electric motor 154 may also be operated as a generator to provide electrical power to charge traction battery 158, for example, during a braking operation. It should be appreciated that while FIG. 1 depicts an electric motor 154 mounted in a rear wheel drive configuration, other configurations are possible, such as employing electric motor 154 in a front wheel configuration, or in a configuration in which there is an electric motor mounted to both the rear vehicle wheels 155 and front vehicle wheels 156. It should also be appreciated that while FIG. 1 depicts a vehicle system 106 that includes only one electric motor, other configurations are possible, including two or more electric motors included therein.

Electric motor 154 may include a gearbox integrated therein (to be described further herein). Additionally or alternatively, the electric motor 154 may be coupled to an outside of a transmission/gearbox housing. The integrated gearbox may include one or more PTOs. Electric motor 154 may also include at least one clutch. Controller 112 may send a signal to an actuator of the clutch(es) to engage or disengage the clutch(es), so as to couple or decouple power transmission from the electric motor 154 to the rear vehicle wheels 155 or the front vehicle wheels 156. Additionally or alternatively, there may be multiple traction batteries configured to provide power to different driven wheels, wherein power to the wheels may be predicated based on traction at the wheels, driver demand, and other conditions. In one example, the vehicle system 106 includes a symmetric four speed schematic wherein there are an equal number of forward and reverse drive speeds.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

Referring now to FIG. 2, a schematic of an example transmission layout according to the present disclosure is shown. The dual-motor electrical transmission for an electrical vehicle comprises two electric machines. The electric machines may be traction motor-generators. The two electric machines may be a first electric motor 200 (e.g., a first traction motor), which is controlled by a first inverter controller 201, and a second electric motor 202 (e.g., a second traction motor), which is controlled by a second inverter controller 203. The first electric motor 200 and second electric motor 202 are configured to drive the electrical vehicle. In some embodiments, the first electric motor 200 is rotationally coupled to a first shaft 254 and the second electric motor 202 is rotationally coupled to a second shaft 234. The transmission further comprises a first set of gear clutches 210, a second set of gear clutches 212, a summation box 214, and a PTO gear arrangement 216.

In some embodiments, the first set of gear clutches 210 comprises a first shaft 254 and a first pair of gear clutches coupled to the first shaft 254. The first pair of gear clutches may include a first gear clutch 247 and a second gear clutch 251, wherein each of the first gear clutch 247 and the second gear clutch 251 comprises a gear and a dog clutch. For example, first gear clutch 247 comprises a first gear 246 and a first dog clutch 248 and second gear clutch 251 comprises a second gear 250 and a second dog clutch 252. In some examples, both of the first dog clutch 248 and the second dog clutch 252 may be synchronizers that include synchro-rings to frictionally accelerate and/or decelerate the first shaft 254 with which the synchronizers may be engaged. Each of the first gear 246 or the second gear 250 may be selectively engaged and/or disengaged with the first shaft 254 via the first dog clutch 248 or the second dog clutch 252, respectively. The first electric motor 200 may be coupled to the first shaft 254 via a shaft 240 and a fixed gear set 206. Fixed gear set 206 comprises a first gear 242 and a second gear 244. First gear 242 is permanently engaged with the shaft 240 and the second gear 244 is permanently engaged with the first shaft 254. First gear 242 and second gear 244 are meshed with one another such that the first shaft 254 is coupled to the shaft 240 via the fixed gear set 206.

In some embodiments, the second set of gear clutches 212 comprises a second shaft 234 and a second pair of gear clutches. The second pair of gear clutches may be similar to the first pair of gear clutches. The second pair of gear clutches may include a first gear clutch 227 and a second gear clutch 231, wherein each of the first gear clutch 227 and the second gear clutch 231 comprises a gear and a dog clutch. For example, first gear clutch 227 comprises a first gear 226 and a first dog clutch 228 and second gear clutch 231 comprises a second gear 230 and a second dog clutch 232. In some examples, both of the first dog clutch 228 and the second dog clutch 232 may be synchronizers that includes synchro-rings to frictionally accelerate and/or decelerate the second shaft 234 with which the synchronizers may be engaged. Each of the first gear 226 or the second gear 230 may be selectively engaged and/or disengaged with the second shaft 234 via the first dog clutch 228 or the second dog clutch 232. The second set of gear clutches 212 may further comprise a shaft 220 and a fixed gear set 208 comprising a first gear 222 and a second gear 224. The first gear 222 is permanently engaged with the shaft 220, whereas the second gear 224 is permanently engaged with the second shaft 234. The first gear 222 and the second gear 224 may be meshed with one another such that the second shaft 234 is coupled to the shaft 220 via the fixed gear set 208.

The summation box 214 comprises an output shaft 268, a first gear 262 and a second gear 260 which are permanently engaged with the output shaft 268. The output shaft 268 is further connected to a front output yoke 266 and a rear output yoke 264. Front output yoke 266 and rear output yoke 264 are configured to deliver the combined output torque to the wheels of the vehicle (e.g., front and rear wheels via the front output yoke 266 and the rear output yoke 264, respectively). Both the first gear 246 of the first set of gear clutches 210 and the first gear 226 of the second set of gear clutches 212 are meshed with the first gear 262 of the summation box 214. Further, both the second gear 250 of the first set of gear clutches 210 and the second gear 230 of the second set of gear clutches 212 are meshed with the second gear 260 of the summation box 214. Thus, both the first electric motor 200 and the second electric motor 202 may drive the output alone in either first or second operating gear of the transmission or, alternatively, the first electric motor 200 and the second electric motor 202 may drive the output together in the first or second operating gear of the transmission.

The PTO gear arrangement 216 comprises two PTO clutches, two sets of gears, and a PTO. The two PTO clutches may be dog clutches. The PTO may be a hydraulic pump that may comprise a secondary shaft (not shown) to transfer power from the first electric motor 200 and/or second electric motor 202 to a secondary device. The addition of the PTO eliminates the need for an additional engine or motor to power other devices, therefore reducing size requirements of the system and reducing overall cost.

A first PTO gear set 270 may comprise a first gear 272 that may be optionally coupled to (e.g., engaged with) the first shaft 254 via a first PTO clutch 274. The first PTO gear set 270 may further comprise a second gear 282 that is rotationally coupled to the first gear 272 of the first PTO gear set 270. The second gear 282 may be fixedly coupled to an input shaft 284 of a PTO 280.

A second PTO gear set 276 may comprise a third gear 290 that may be optionally coupled to the second shaft 234 via a second PTO clutch 292. The second PTO gear set 276 may further comprise a fourth gear 294 that meshes with the third gear 290 of the second PTO gear set 276. The fourth gear 294 may be fixedly coupled to a layshaft 296. The fourth gear 294 may be further meshed with (e.g., rotationally coupled to) the second gear 282 of the first PTO gear set 270, thereby connecting the second PTO gear set 276 to the PTO 280.

In some examples, both of the first PTO clutch 274 and the second PTO clutch 292 may be synchronizers that include synchro-rings to frictionally accelerate and/or decelerate the first shaft 254 and the second shaft 234, respectively, with which the synchronizers may be engaged.

A controller, such as controller 112 depicted in FIG. 1, may include instructions stored in non-transitory memory that may be executed. When executed during reverse drive operation, the instructions may cause the controller to engage one of a first or second PTO clutches (e.g., first PTO clutch 274 or second PTO clutch 292) and disengage the other one of the first or second PTO clutches. Further, when executed, the instructions may cause the controller to shift between a first operating gear and a second operating gear while the first PTO clutch is engaged while in forward drive mode. Additionally, when executed, the instructions may cause the controller to shift between the first operating gear and the second operating gear while the second PTO clutch is engaged while in reverse drive mode.

In some examples, the first gear 246 of the first set of gear clutches 210 and the first gear 226 of the second set of gear clutches 212 may be of equal size and may comprise a first operating gear of the transmission. The second gear 250 of the first set of gear clutches 210 and the second gear 230 of the second set of gear clutches 212 may also be of equal size, but may be larger when compared to the first gear 246 of the first set of gear clutches 210 and the first gear 226 of the second set of gear clutches 212. The second gear 250 of the first set of gear clutches 210 and the second gear 230 of the second set of gear clutches 212 may comprise a second operating gear of the transmission.

Either first electric motor 200, by engaging first dog clutch 248 of the first set of gear clutches 210, or second electric motor 202, by engaging first dog clutch 228 of the second set of gear clutches 212, may drive alone in the first operating gear of the transmission. Alternatively, the first electric motor 200 and the second electric motor 202 may drive together in the first gear of the transmission by engaging both first dog clutch 248 of the first set of gear clutches 210 and first dog clutch 228 of the second set of gear clutches 212.

Either first electric motor 200, by engaging second dog clutch 252 of the first set of gear clutches 210, or second electric motor 202, by engaging second dog clutch 232 of the second set of gear clutches 212, may drive alone in the second gear of the transmission. Alternatively, both first electric motor 200 and second electric motor 202 may drive together in the second gear of the transmission by engaging both second dog clutch 252 of the first set of gear clutches 210 and second dog clutch 232 of the second set of gear clutches 212.

Thus, in the first as well as the second gear of the transmission, both the first electric motor 200 and the second electric motor 202 may contribute to the output torque and the load may be divided symmetrically among both the first electric motor 200 and the second electric motor 202 in order to increase efficiency of the transmission. With both the first electric motor 200 and the second electric motor 202 being configured to drive in first gear, the maximum output torque of the transmission can be increased.

During conditions in which both the first electric motor 200 and the second electric motor 202 are driving in the first operating gear and contributing to the output torque, with symmetric load on either electric motor, powershifting may be employed to shift into the second operating gear without torque interrupt via a powershifting transient. Powershifting may be realized by the second electric motor 202 using peak performance torque to provide sole power to the outputs while reducing the first electric motor 200 torque to zero. When the first electric motor 200 is not producing any power to the outputs, the first dog clutch 248 of the first set of gear clutches 210 may be disengaged from the first shaft 254 and the second dog clutch 252 of the first set of gear clutches 210 may be engaged with the first shaft 254. The first electric motor 200 may then provide sole power to the outputs while reducing the second electric motor 202 torque to zero. When the second electric motor 202 is not producing any power to the outputs, the first dog clutch 228 of the second set of gear clutches 212 may be disengaged from the second shaft 234 and the second dog clutch 232 may be engaged with the second shaft 234. At the point that the second dog clutch 232 of the second set of gear clutches 212 is engaged with the second shaft 234, the second electric motor 202 torque may be increased to provide power to the outputs and the first electric motor 200 and the second electric motor 202 may again drive together to symmetrically contribute torque to the outputs.

Each of the electric motors may operate at peak performance for a relatively short period of time. The term "short period of time" may herein refer to a period such as 1 second, 5 seconds, 30 seconds, or other suitable time period. The electric motors may not operate at peak performance for durations longer than during a powershifting transient as this may cause overheating of the electric motors.

During conditions in which the first PTO clutch 274 is engaged with the first shaft 254, the PTO may be powered by the first electric motor 200. In such examples, the output speed of the first electric motor 200 determines the input speed to the PTO 280. Consequently, if the first electric motor 200 is operating at low speed in first gear, the PTO will also operate at low speed. PTO driven hydraulic pumps necessitate a minimum speed in order to operate properly. This minimum speed may be higher in comparison to the low speed output in first gear of the first electric motor 200. During embodiments in which there is only the first PTO gear set 270 included in the PTO gear arrangement 216 (meaning that the PTO 280 may not be coupled to the second electric motor 202), in order for the first electric motor 200 to run at low speed in first gear, the PTO 280 may be disconnected from the first electric motor 200. The disconnection of the PTO 280 from the first electric motor 200 may be realized by disengaging the first PTO clutch 274 of the PTO gear arrangement 216 from the first shaft 254. Thus, if the PTO gear arrangement 216 only includes the first PTO gear set, at low speed in first gear, the PTO 280 may not receive power. Consequently, in order to power the PTO 280 via the first electric motor 200, the speed of the first electric motor 200 may be high when in the first operating gear in forward drive mode. Alternatively, the transmission may be in the second operating gear at either low speed or high speed.

Additionally, the PTO may necessitate a forward drive. Thus, if the PTO gear arrangement 216 only includes the first PTO gear set 270 and the first electric motor 200 is operating in reverse driving mode, the PTO 280 may be disconnected from the first electric motor 200 by way of disengaging the first PTO clutch 274 of the first PTO gear set 270 from the first shaft 254.

The second PTO clutch 292 and the gears included in the second PTO gear set 276 may allow for the PTO 280 to be powered even in reverse drive mode. When both the first electric motor 200 and second electric motor 202 are contributing combined torque to the output in reverse drive mode, the PTO 280 may not be connected to the first electric motor 200 as the PTO 280 rotation would consequently be in reverse. The second PTO gear set 276, however, contains an additional gear (e.g., the fourth gear 294) coupled to a layshaft (e.g., the layshaft 296) which, when the second PTO clutch 292 is engaged with the second shaft 234 rather than the first PTO clutch 274 being engaged with the first shaft 254, switches the rotational direction of the input shaft 284 of the PTO 280. Consequently, the second electric motor 202 may be in reverse drive mode and yet still power a forward rotation of the PTO 280. Also consequently, the second PTO clutch 292 may not be engaged with the second shaft 234 when the second electric motor 202 is in forward drive mode. Thus, the first and second PTO clutches may be selectively engaged or disengaged based on drive mode of the electric motors in order to selectively deliver mechanical power to the PTO 280.

Turning now to FIGS. 3A-3H, tables are shown of each available configuration of the clutches of a transmission system, such as transmission system 205 of FIG. 2. FIG. 3A depicts the configuration of the first dog clutch 248 of the first set of gear clutches 210, the second dog clutch 252 of the first set of gear clutches 210, the first dog clutch 228 of the second set of gear clutches 212, the second dog clutch 232 of the second set of gear clutches 212, the first PTO clutch 274, and the second PTO clutch 292 in a first, second, third, fourth, fifth, sixth, and seventh operating mode of the transmission system. FIGS. 3B-3H depict transfers states between each of the operating modes of the transmission system.

As depicted in FIG. 3A, in the first mode of the transmission system (e.g., transmission system 205 depicted in FIG. 2) wherein the transmission is in the first operating gear in forward drive without a PTO engaged, the first dog clutch 248 of the first set of gear clutches 210 is engaged, the second dog clutch 252 of the first set of gear clutches 210 is disengaged, the first PTO clutch 274 is disengaged, the first dog clutch 228 of the second set of gear clutches 212 is engaged, the second dog clutch 232 of the second set of gear clutches 212 is disengaged, and the second PTO clutch 292 is disengaged. In the first mode of the transmission system, the speed of the first electric motor 200 may be low, the speed of the second electric motor 202 may be low, and the speed of the PTO may be zero as it is disengaged from both electric motors. Thus, both the first and second electric motors are providing torque to power the output symmetrically when no PTO is engaged.

In the second mode of the transmission system wherein the transmission is in the first operating gear in forward drive with a PTO engaged and an output is powered by one electric motor, the first dog clutch 248 of the first set of gear clutches 210 is disengaged, the second dog clutch 252 of the first set of gear clutches 210 is disengaged, the first PTO clutch 274 is engaged, the first dog clutch 228 of the second set of gear clutches 212 is engaged, the second dog clutch 252 of the second set of gear clutches 212 is disengaged, and the second PTO clutch 292 is disengaged. In the second configuration of the transmission system, the speed of the first electric motor 200 may be high, the speed of the second electric motor 202 may be low, and the speed of the PTO may be high (matching the speed of the first electric motor 200 to which it is coupled via first PTO clutch 274). Thus, in the second mode of the transmission system, the speed of the second electric motor dictates the speed of the outputs while the speed of the first electric motor dictates the speed of the PTO, and therefore the output speed is low and the PTO speed is high, matching the speed of the first electric motor.

In the third mode of the transmission system wherein the transmission is in the first operating gear in forward drive with a PTO engaged and an output is powered by two electric motors, the first dog clutch 248 of the first set of gear clutches 210 is engaged, the second dog clutch 252 of the first set of gear clutches 210 is disengaged, the first PTO clutch 274 is engaged, the first dog clutch 228 of the second set of gear clutches 212 is engaged, the second dog clutch 252 of the second set of gear clutches 212 is disengaged, and the second PTO clutch 292 is disengaged. In the third mode of the transmission system, the speed of the first electric motor 200 may be high, the speed of the second electric motor 202 may be high, and the speed of the PTO may be high (matching the speed of the first electric motor 200 to which it is coupled via first PTO clutch 274). Thus, both electric motors are providing torque to power the output and the first electric motor is powering the PTO.

In the fourth mode of the transmission system wherein the transmission is in the second operating gear in forward drive with a PTO engaged and an output is powered by two electric motors, the first dog clutch 248 of the first set of gear clutches 210 is disengaged, the second dog clutch 252 of the first set of gear clutches 210 is engaged, the first PTO clutch 274 is engaged, the first dog clutch 228 of the second set of gear clutches 212 is disengaged, the second dog clutch 252 of the second set of gear clutches 212 is engaged, and the second PTO clutch 292 is disengaged. In the fourth mode of the transmission system, the speed of the first electric motor 200 may be low, the speed of the second electric motor 202 may be low, and the speed of the PTO may be low (matching the speed of the first electric motor 200 to which it is coupled via first PTO clutch 274). Thus, both electric motors are providing torque to power the output and the first electric motor is powering the PTO.

In the second operating gear, the low speed of each of the electric motors is sufficient for the PTO (as a hydraulic pump). This is opposed to the first operating gear, wherein the low speed of each of the electric motors is not sufficient for the PTO and therefore when the PTO is engaged with either of the electric motors in the first operating gear of the transmission, the speed of the electric motor to which it is engaged may be high in order to be sufficient to power the PTO.

In the fifth mode of the transmission system wherein the transmission is in the first operating gear in reverse drive with a PTO engaged and an output is powered by one electric motor, the first dog clutch 248 of the first set of gear clutches 210 is disengaged, the second dog clutch 252 of the first set of gear clutches 210 is disengaged, the first PTO clutch 274 is engaged, the first dog clutch 228 of the second set of gear clutches 212 is engaged, the second dog clutch 252 of the second set of gear clutches 212 is disengaged, and the second PTO clutch 292 is disengaged. In the fifth mode of the transmission system, the speed of the first electric motor 200 may be high, the speed of the second electric motor 202 may be low reverse, and the speed of the PTO may be high (matching the speed of the first electric motor 200 to which it is coupled via first PTO clutch 274). In the fifth mode of the transmission system, the speed of the second electric motor dictates the speed of the outputs while the speed of the first electric motor dictates the speed of the PTO, and therefore the output is in low reverse and the PTO speed is high, matching the speed of the first electric motor.

In the sixth mode of the transmission system wherein the transmission is in the first operating gear in reverse drive with a PTO engaged and an output is powered by two electric motors, the first dog clutch 248 of the first set of gear clutches 210 is engaged, the second dog clutch 252 of the first set of gear clutches 210 is disengaged, the first PTO clutch 274 is disengaged, the first dog clutch 228 of the second set of gear clutches 212 is engaged, the second dog clutch 252 of the second set of gear clutches 212 is disengaged, and the second PTO clutch 292 is engaged. In the fifth mode of the transmission system, the speed of the first electric motor 200 may be high reverse, the speed of the second electric motor 202 may be high reverse, and the speed of the PTO may be high. In the sixth mode of the transmission system, the speed of the second electric motor dictates the speed of the PTO because the PTO is engaged via the second PTO clutch 292. Because of the fourth gear 294 that rotationally couples the PTO 280 to the second shaft 234 (via the second gear 282 and the third gear 290), which couples to the second electric motor 202, the rotational direction is reversed and therefore the second electric motor 202 is in high reverse while the PTO is in high forward. Both the first electric motor 200 and the second electric motor 202 are in high reverse and therefore the output is in high reverse.

In the seventh mode of the transmission system wherein the transmission is in the second operating gear in reverse drive with a PTO engaged and an output being powered by two electric motors, the first dog clutch 248 of the first set of gear clutches 210 is disengaged, the second dog clutch 252 of the first set of gear clutches 210 is engaged, the first PTO clutch 274 is disengaged, the first dog clutch 228 of the second set of gear clutches 212 is disengaged, the second dog clutch 252 of the second set of gear clutches 212 is engaged, and the second PTO clutch is engaged. In the fifth mode of the transmission system, the speed of the first electric motor 200 may be high, the speed of the second electric motor 202 may be low reverse, and the speed of the PTO may be high (matching the speed of the first electric motor 200 to which it is coupled via first PTO clutch 274). Thus, both electric motors are providing torque to power the output and the second electric motor is powering the PTO.

Turning to FIG. 3B, transition (e.g., transfer) state(s) between an off mode of the transmission system and the first mode of the transmission system are shown in a table. In the off mode, all of the clutches are open and all of the speeds are zero as no clutches are engaged and both a first and second electric machine (e.g., first electric motor 200 and second electric motor 202) are powered off. A transfer state between the off mode and the first mode of the transmission system includes engaging (e.g., closing) a first dog clutch of a first set of gear clutches (e.g., first dog clutch 248) and closing a first dog clutch of a second set of gear clutches (e.g., first dog clutch 228). Once the first dog clutch of each of the first and second set of gear clutches is engaged, torque of the first and second electric motors may increase to a value greater than zero and the speed of each of the electric machines is low. The torque of the first electric motor may be equal to the torque of the second electric motor as both electric motors are contributing equally (e.g., symmetrically) to the output. As stated, a PTO is not engaged in the first mode of the transmission system and therefore speed of the PTO is zero.

Referring now to FIG. 3C, transfer states between the first mode of the transmission system and the second mode of the transmission system are shown in a table. In the first mode of the transmission system, the first dog clutch of both the first and second sets of gear clutches is engaged, the speed of both the first and second electric machines (e.g., electric motors) is low, and the torque of both the first and second electric machines is the value greater than zero. In a first transfer state, the torque of the first electric machine is decreased to zero. In a second transfer state, the first dog clutch of the first set of gear clutches is disengaged. In a third transfer state, the speed of the first electric machine is reduced to zero. In a fourth transfer state, the first PTO clutch is engaged. Once the first PTO clutch is engaged, the speed of the first electric machine is increased to high and the torque of the first electric machine is increased to the value greater than zero, transitioning the transmission into the second mode.

Referring now to FIG. 3D, transfer states between the second mode of the transmission system and the third mode of the transmission system are shown in a table. As stated, in the second mode of the transmission system, the first PTO clutch is engaged and the first dog clutch of the second set of gear clutches is engaged, the speed of first electric machine is high and the speed of the second electric machine is low in the first operating gear, and the torque of both the first and second electric machines is the value greater than zero. In a first transfer state, the speed of the second electric motor may be increased to high. Once the speed of the second electric machine is increased to high, the first dog clutch of the first set of gear clutches may be engaged to transition the transmission system into the third mode.

Turning to FIG. 3E, transfer states between the third mode of the transmission system and the fourth mode of the transmission system are shown in a table. As stated, in the third mode of the transmission system, both first dog clutches of the first and second sets of gear clutches are engaged, the torque of both electric machines is greater than zero, and the speed of both electric machines is high in the first operating gear. In a first transfer state, the torque of the first electric machine may be reduced to zero and the torque of the second electric machine may be increased to a peak performance torque. In a second transfer state, the first dog clutch of the first set of gear clutches may be disengaged. In a third transfer state, the speed of the first electric machine may be reduced to low. In a fourth transfer state, the second dog clutch of the first set of gear clutches may be engaged. In a fifth transfer state, the torque of the first electric machine may be increased to a peak performance torque and the torque of the second electric machine may be decreased to zero. In a sixth transfer state, the first dog clutch of the second set of gear clutches may be disengaged. In a seventh transfer state, the speed of the second electric machine may be reduced to low. In an eighth transfer state, the second dog clutch of the second set of gear clutches may be engaged. Once the second dog clutch of the second set of gear clutches is engaged, the torque of the first electric machine may be reduced to the value greater than zero and the torque of the second electric machine may be increased to the value greater than zero to transition the transmission system into the fourth mode of the transmission system. The torques of the first and second electric machines may be equal in the fourth mode of the transmission system as each electric machine is contributing an equal amount of torque to power the output.

Referring now to FIG. 3F, a transfer state between the second mode of the transmission system and the fifth mode of the transmission is shown in a table. As stated, in the second mode of the transmission, the first dog clutch of the second set of gear clutches is engaged and the first PTO clutch is engaged, the first electric machine speed is high, the second electric machine speed is low, and the torques of the first and second electric machine are a value greater than zero. The fifth mode of the transmission includes all of the same configurations as the second mode of the transmission except that the second electric machine speed is low reverse. Transfer between the second mode and the fifth mode of the transmission includes changing the rotational direction of the second electric machine from low forward to low reverse.

Turning now to FIG. 3G, transfer states between the fifth mode of the transmission system and the sixth mode of the transmission system are shown in a table. In the fifth mode, the first dog clutch of the second set of gear clutches is engaged and the first PTO clutch is engaged, the first electric machine and the PTO speeds are high and the second electric machine speed is low reverse. In a first transfer state, the first electric machine speed may be reduced to low and consequently the PTO speed is reduced to low. In a second transfer state, the second PTO clutch may be closed. In a third transfer state, the torque of the first electric machine may be reduced to zero and the torque of the second electric machine may be increased to a peak performance torque. In a fourth transfer state, the first PTO clutch may be disengaged. In a fifth transfer state, the speed of the first electric machine may be changed from low to low reverse. In a sixth transfer state, the torque of the first electric machine may be increased to the value greater than zero and the torque of the second electric machine may be decreased to the value greater than zero. The torques of the first and second electric machines may be equal. Once the torques are equal, the speed of the second electric machine may be increased to high reverse and consequently the PTO speed is increased to high, transitioning the system into the sixth mode of the transmission system.

Referring now to FIG. 3H, transfer states between the sixth mode of the transmission and the seventh mode of the transmission are shown in a table. In the sixth mode of the transmission, the first dog clutches of the first and second sets of gear clutches are engaged and the second PTO clutch is engaged, the torques of the first and second electric machine are equal and greater than zero, the speeds of the first and second electric machines are high reverse and the speed of the PTO is high. In a first transfer state, the torque of the first electric machine may be reduced to zero and the torque of the second electric machine may be increased to a peak performance torque. In a second transfer state, the first dog clutch of the first set of gear clutches may be disengaged. In a third transfer state, the speed of the first electric machine may be reduced to low reverse. In a fourth transfer state, the second dog clutch of the first set of gear clutches may be engaged. In a fifth transfer state, the torque of the first electric machine may be increased to a peak performance torque and the torque of the second electric machine may be reduced to zero. In a sixth, the first dog clutch of the second set of gear clutches may be disengaged. In a seventh transfer state, the speed of the second electric motor may be reduced to low reverse and consequently, the PTO speed is reduced to low. In an eighth transfer state, the second dog clutch of the second set of gear clutches may be engaged. Once the second dog clutch of the second set of gear clutches is engaged, the torque of the first electric machine may be decreased to the value greater than zero and the torque of the second electric machine may be increased to the value greater than zero. The torques of the first and second electric machines may be equal and both electric motors may contribute equal torque to the output.

Figure 4:
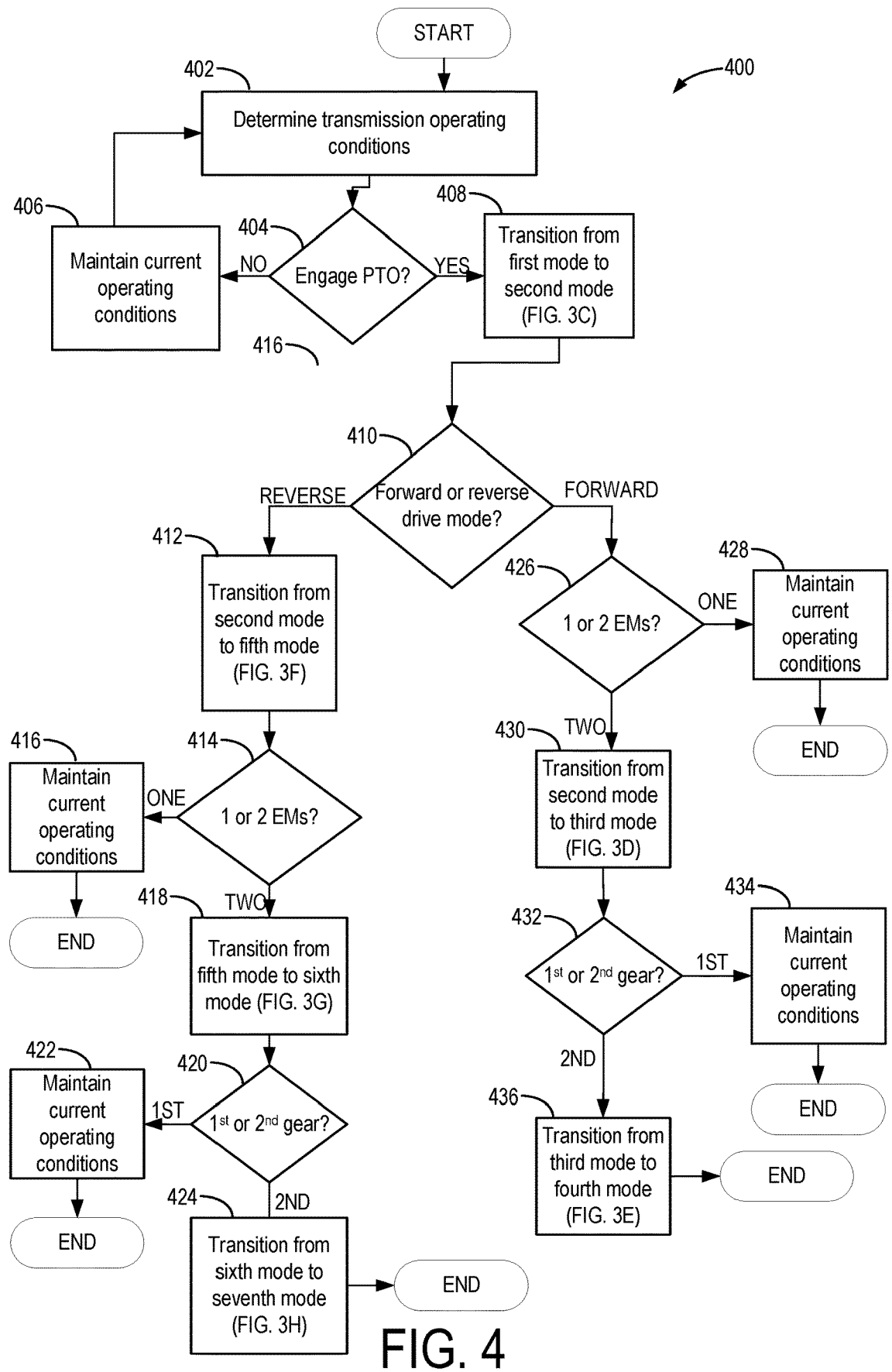
FIG. 4 is a method for operation of a transmission system.

Referring now to FIG. 4, an example method for operating a transmission that includes at least one power take off (PTO) is shown. Method 400 may comprise selective engagement of one or more clutches to transition or transform an operating mode of the transmission. Method 400 may be at least partially implemented as executable instructions stored in controller memory in the system of FIGS. 1-2. Further method 400 may include actions taken in the physical world to transform the operating mode of the system of FIGS. 1-2. Additionally, method 400 may provide at least some of the operating modes shown in FIGS. 3A-H.

At 402, method 400 determines vehicle operating conditions. Vehicle operating conditions may include, but are not limited to, PTO engagement, electric machine drive mode, number of electric machines contributing torque/power to output, and transmission operating gear. The vehicle operating conditions may be determined from the vehicle's sensors. The vehicle operating conditions may begin in a first mode (e.g., the first mode referenced with respect to FIG. 3A). Method 400 proceeds to 404.

At 404, method 400 judges whether or not engagement of a PTO is requested. Engagement of the PTO may be requested based on user input or via a control system based on vehicle operating conditions. Engagement of the PTO may be provided in select modes as indicated in the table depicted in FIG. 3A. If method 400 judges that the PTO is to be engaged, the answer is YES and the method 400 proceeds to 408. Otherwise, the answer is NO and the method proceeds to 406.

At 406, method 400 maintains the current operating conditions of the transmission. Without the PTO engaged, as such is the current operating conditions at 406, both the first and the second electric machines may be providing torque/power to the output symmetrically. A powershifting transient may be enabled when transitioning from a first gear to a second gear in the first mode of the transmission.

At 408, method 400 transitions the transmission from the first mode to a second mode (e.g., the second mode detailed with respect to FIG. 3A). Transition from the first mode to the second mode may be completed via transfer states detailed with respect to FIG. 3C. The vehicle operating condition that changes at 408 is PTO engagement, whereby in the first mode of the transmission the PTO is not engaged and in the second mode of the transmission the PTO is engaged. Transitioning from the first mode to the second mode may entail reducing the speed and torque of the first electric machine, selectively disengaging a first dog clutch of a first set of gear clutches of the first electric machine, selectively engaging a first PTO clutch, and finally increasing the first electric machine speed and torque to provide power to the PTO. Method 400 proceeds to 410.

At 410, method 400 judges whether the system is to be driven in forward or reverse drive mode. The system is currently in the second operating mode in which the second electric machine is powering the output and the first electric machine is powering the PTO, both in forward drive mode. Drive mode may be requested based on user input or via the control system based on vehicle operating conditions. If the method 400 judges that the system is to transition to a reverse drive mode, the method 400 proceeds to 412. Otherwise, the method 400 judges that the system is to remain in forward drive mode and the method 400 proceeds to 426.

At 412, method 400 transitions the transmission from the second mode of the transmission to a fifth mode (e.g., fifth mode detailed with respect to FIG. 3A). Transition from the second mode to the fifth mode may be completed via transfer states detailed with respect to FIG. 3F. The vehicle operating condition that changes at 412 is electric machine drive mode, whereby the second electric machine transitions from a forward drive mode to a reverse drive mode. The first electric machine may maintain a forward drive to power the PTO. All other vehicle operating conditions are maintained in the transition from the second mode to the fifth mode. Method 400 proceeds to 414.

At 414, method 400 judges whether power to the output via both the first and second electric machines or via one of the two electric machines is requested. In the fifth mode of the transmission, the second electric machine is solely providing power/torque to the output while the first electric machine is providing power to the PTO. Number of electric machines providing power/torque to the output may be requested by user input or via a control system based on vehicle operating conditions. If method 400 judges that power to the output via one electric machine is requested, the method proceeds to 416. If method 400 judges that power to the output via both the first and second electric machines is requested, the method proceeds to 418.

At 416, the method 400 maintains the current vehicle operating conditions and proceeds to exit.

At 418, the method 400 transitions the transmission from the fifth mode to a sixth mode (e.g., the sixth mode detailed with respect to FIG. 3A). Transition from the fifth mode to the sixth mode may be completed via transfer states outlined with respect to FIG. 3G. The vehicle operating condition that is changed is the number of electric machines engaged to provide power/torque to the output. The transfer states may entail decreasing/increasing torque and speed, transitioning from forward to reverse drive modes, and selectively disengaging the first PTO clutch and selectively engaging a second PTO clutch. Selective engagement of the second PTO clutch and selective disengagement of the first PTO clutch means that the PTO is powered by the second electric machine in the sixth mode of the transmission. The method 400 proceeds to 420.

At 420, method 400 judges if the transmission is to be operated in the first operating gear or the second operating gear. Current vehicle operation in the sixth mode is in first operating gear. If the method 400 judges the transmission is to be operated in the first operating gear, the method 400 proceeds to 422. If the method 400 judges that the transmission is to be operated in the second operating gear, the method 400 proceeds to 424.

At 422, the method 400 maintains the current operating conditions of the vehicle. Method 400 then proceeds to exit.

At 424, method 400 transitions the transmission from the sixth operating mode to a seventh operating mode (e.g., the seventh operating mode detailed with respect to FIG. 3A). Transition from the sixth mode to the seventh mode may be completed via transfer states outlined with respect to FIG. 3H. The vehicle operating condition that is changed is the transmission operating gear (e.g., transitioning from the first operating gear to the second operating gear). At least one powershifting transient may be utilized while selective engagement of both the second clutches and selective disengagement of both the first clutches is performed. The powershifting transient may entail decreasing/increasing electric machine speed and torque while engaging/disengaging relevant clutches. Sustaining engagement of the second PTO clutch and sustaining disengagement of the first PTO clutch may be included in the powershifting transient between the sixth and seventh modes of the transmission.

If at 410 the method 400 judges that the system is to remain in forward drive mode, the method 400 proceeds to 426. At 426, method 400 judges whether power to the output via both the first and second electric machines or via one of the two electric machines is requested. In the second mode of the transmission, the second electric machine is solely providing power/torque to the output while the first electric machine is providing power to the PTO. Number of electric machines providing power/torque to the output may be requested by user input or via a control system based on vehicle operating conditions. If method 400 judges that power to the output via one of the two electric machines is requested, the method proceeds to 428. If method 400 judges that power to the output via both the first and second electric machines is requested, the method proceeds to 430.

At 428, method 400 maintains the current operating conditions and proceeds to exit.

At 430, method 400 transitions the transmission from the second mode to a third mode (e.g., the third mode detailed with respect to FIG. 3A). Transition from the second mode to the third mode may be completed via transfer states outlined with respect to FIG. 3D. The vehicle operating condition that is changed at 430 is the number of electric machines engaged to provide power/torque to the output. The transfer states may entail increasing speed of the second electric machine and selectively engaging the first clutch of the first set of gear clutches. The method 400 proceeds to 432.

At 432, method 400 judges if the transmission is to be operated in the first operating gear or the second operating gear. Current vehicle operation in the third mode is in first operating gear. If the method 400 judges the transmission is to be operated in the first operating gear, the method 400 proceeds to 434. If the method 400 judges that the transmission is to be operated in the second operating gear, the method 400 proceeds to 436.

At 434, the method 400 maintains the current operating conditions of the vehicle and then proceeds to exit.

At 436, method 400 transitions the transmission from the third operating mode to a fourth operating mode (e.g., the fourth operating mode detailed with respect to FIG. 3A). Transition from the third mode to the fourth mode may be completed via transfer states outlined with respect to FIG. 3E. The vehicle operating condition that is changed is the transmission operating gear (e.g., transitioning from the first operating gear to the second operating gear). At least one powershifting transient may be utilized while selective engagement of both the second clutches and selective disengagement of both the first clutches is performed. The powershifting transient may entail decreasing/increasing electric machine speed and torque while engaging/disengaging relevant clutches. Sustaining engagement of the first PTO clutch and sustaining disengagement of the second PTO clutch may be included in the powershifting transient between the third and fourth modes of the transmission.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

Turning now to FIG. 5, a transmission operating system sequence for a forward drive mode is shown. The operating sequence of FIG. 5 may be provided via the system of FIGS. 1-2 in cooperation with the method of FIG. 4 and the tables of FIG. 3A-E. The vertical lines at times t0-t10 represent times of interest during the operating sequence. The plots are time aligned. The horizontal axis of each plot represents time and time increases from the left side of the plot to the right side of the plot.

The first plot from the top of FIG. 5 is a plot of a state of a first clutch of a first set of gear clutches (e.g., first dog clutch 248 of the first set of gear clutches 210) optionally engaged with a first shaft (e.g., first shaft 254) of a first electric machine (e.g., first electric motor 200) versus time. The first clutch of the first set of gear clutches herein described may either be engaged or disengaged. When trace 502 is at a lower level that is near the horizontal axis, the first clutch of the first set of gear clutches is in the disengaged state. When trace 502 is at a higher level that is near the vertical axis arrow, the first clutch of the first set of gear clutches is in the engaged state. Trace 502 represents the state of the first clutch of the first set of gear clutches. The state of the first clutch of the first set of gear clutches may be asserted via an actuator of a control system of the transmission system.

The second plot from the top of FIG. 5 is a plot of a state of a first clutch of a second set of gear clutches (e.g., first dog clutch 228 of the second set of gear clutches 212) optionally engaged with a second shaft (e.g., second shaft 234) of a second electric machine (e.g., second electric motor 202) versus time. The first clutch of the second set of gear clutches herein described may either be engaged or disengaged. When trace 504 is at a higher level that is near the vertical axis arrow, the first clutch of the second set of gear clutches is in the engaged state. When trace 504 is at a lower level that is near the horizontal axis, the first clutch of the second set of gear clutches is in a disengaged state. Trace 504 represents the state of the first clutch of the second set of gear clutches. The state of the first clutch of the second set of gear clutches may be asserted via an actuator of a control system of the transmission system.

The third plot from the top of FIG. 5 is a plot of a state of a second clutch of the first set of gear clutches (e.g., second dog clutch 252 of the first set of gear clutches 210) optionally engaged with a first shaft (e.g., first shaft 254) of a first electric machine (e.g., first electric motor 200) versus time. The second clutch of the first set of gear clutches herein described may either be engaged or disengaged. When trace 506 is at a higher level that is near the vertical axis arrow, the second clutch of the first set of gear clutches is in the engaged state. When trace 506 is at a lower level that is near the horizontal axis, the second clutch of the first set of gear clutches is in a disengaged state. Trace 506 represents the state of the second clutch of the first set of gear clutches. The state of the second clutch of the first set of gear clutches may be asserted via an actuator of a control system of the transmission system.

The fourth plot from the top of FIG. 5 is a plot of a state of a second clutch of the second set of gear clutches (e.g., second dog clutch 232 of the second set of gear clutches 212) optionally engaged with a second shaft (e.g., second shaft 234) of a second electric machine (e.g., second electric motor 202) versus time. The second clutch of the second set of gear clutches herein described may either be engaged or disengaged. When trace 508 is at a higher level that is near the vertical axis arrow, the second clutch of the second set of gear clutches is in the engaged state. When trace 508 is at a lower level that is near the horizontal axis, the second clutch of the second set of gear clutches is in a disengaged state. Trace 508 represents the state of the second clutch of the second set of gear clutches. The state of the second clutch of the second set of gear clutches may be asserted via an actuator of a control system of the transmission system.

The fifth plot from the top of FIG. 5 is a plot of the state of a first PTO clutch (e.g., first PTO clutch 274) optionally engaged with a first shaft (e.g., first shaft 254) of a first electric machine (e.g., first electric motor 200). The first PTO clutch herein described may either be engaged or disengaged. When trace 510 is at a higher level that is near the vertical axis arrow, the first PTO clutch is in an engaged state. When trace 510 is at a lower level that is near the horizontal axis, the first PTO clutch is in a disengaged state. Trace 510 represents the state of the first PTO clutch. The state of the first PTO clutch may be asserted via an actuator of a control system of the transmission system.

The sixth plot from the top of FIG. 5 is a plot of the speed of a first electric machine (e.g., first electric motor 200) and a second electric machine (e.g., second electric motor 202). The speed of either motor may be high, low, or zero. Trace 512 represents the speed of the first electric machine and trace 514 represents the speed of the second electric machine. When trace 512 is at a higher level that is near the vertical axis arrow, the speed of the first electric machine is high. When trace 514 is at a higher level that is near the vertical axis arrow, the speed of the second electric motor is high. When trace 512 is at a lower level that is near the horizontal axis, the speed of the first electric machine is zero. When trace 514 is at a lower level that is near the horizontal axis, the speed of the second electric machine is zero. When trace 512 is at a level between the higher level and the lower level (e.g., in the middle of the vertical axis), the speed of the first electric machine is low. When trace 514 is at a level between the higher level and the lower level (e.g., in the middle of the vertical axis), the speed of the second electric machine is low. The speed of both electric machines may be asserted via an actuator of a control system.

The seventh plot from the top of FIG. 5 is a plot of torques of the first electric machine (e.g., first electric motor 200) and the second electric machine (e.g., second electric motor 202). The torque of either motor may be zero, a value greater than zero, or increased, meaning a peak performance torque. Trace 516 represents the torque of the first electric machine and trace 518 represents the torque of the second electric machine. When trace 516 is at a higher level that is near the vertical axis arrow, the torque of the first electric machine is increased. When trace 518 is at a higher level that is near the vertical axis arrow, the torque of the second electric motor is increased. When trace 516 is at a lower level that is near the horizontal axis, the torque of the first electric machine is zero. When trace 518 is at a lower level that is near the horizontal axis, the torque of the second electric machine is zero. When trace 516 is at a level between the higher level and the lower level (e.g., in the middle of the vertical axis), the torque of the first electric machine is the value greater than zero. When trace 518 is at a level between the higher level and the lower level (e.g., in the middle of the vertical axis), the torque of the second electric machine is the value greater than zero. The torque of both electric machines may be asserted via an actuator of a control system.

At time t0, both first clutches are engaged and both second clutches are disengaged, the first PTO clutch is disengaged, the speed of both electric machines is low, and the torque of both electric machines is the value greater than zero. Time t0 represents a first mode (e.g., the first mode described with reference to FIG. 3A) of the transmission system wherein the transmission is in a first operating gear without a PTO engaged and two electric motors providing power to an output. Between times t0 and t1, the torque of the first electric machine decreases to zero. At time t2, the first clutch of the first set of gear clutches transitions from engaged to disengaged. Between times t2 and t3, the speed of the first electric machine decreases from low to zero. At time t3, the first PTO clutch transitions from disengaged to engaged. Between times t3 and t4, the torque of the first electric machine increases to the value greater than zero and the speed of the first electric machine increases from zero to high. Time t4 represents a second mode (e.g., the second mode described with reference to FIG. 3A) of the transmission system wherein the transmission is in a first operating gear with a PTO engaged and one electric motor provides power to the output. Between times t4 and t5, the speed of the second electric machine increases from low to high. Time t6 represents a third mode (e.g., the third mode described with reference to FIG. 3A) of the transmission system wherein the transmission is in a first operating gear with a PTO engaged and 2 electric machines providing power to the output. At time t5, the first clutch of the first set of gear clutches transitions from disengaged to engaged. Between time t6 and t7, the torque of the first electric machine decreases to zero and the torque of the second electric machine increases to increased at the same time. Then, the first clutch of the first set of gear clutches transitions from engaged to disengaged. Then, the speed of the first electric machine decreases from high to low.

At time t7, the first second clutch transitions from disengaged to engaged. Between times t7 and t8, the torque of the first electric machine increases from zero to increased and the torque of the second electric machine decreases from increased to zero at the same time. At time t8, the first clutch of the second set of gear clutches transitions from engaged to disengaged. Between times t8 and t9, the speed of the second electric machine decreases from high to low. At time t9, the second clutch of the second set of gear clutches transitions from disengaged to engaged. Between times t9 and t10, the torque of the first electric machine decreases from increased to the value greater than zero and the torque of the second electric machine increases from zero to the value greater than zero at the same time. Time t10 represents a fourth mode (e.g., the fourth mode described with reference to FIG. 3A) of the transmission system wherein the transmission is in a second operating gear with a PTO engaged and two electric machines providing power to the output. It will be understood that the specific clutch control strategy may be more nuanced, in practice. For instance, clutch pressure may be less abruptly ramped up to allow a smoother transition into the second gear to occur and reduce the likelihood of unwanted noise, vibration, and harshness (NVH).

Turning now to FIG. 6, a transmission operating system sequence for a reverse drive mode is shown. The operating sequence of FIG. 6 may be provided via the system of FIGS. 1-2 in cooperation with the method of FIG. 4 and the tables of FIGS. 3A and 3F-H. The vertical lines at times t0-t410 represent times of interest during the operating sequence. The plots are time aligned. The horizontal axis of each plot represents time and time increases from the left side of the plot to the right side of the plot.

The first plot from the top of FIG. 6 is a plot of a state of a first clutch of a first set of gear clutches (e.g., first dog clutch 248 of the first set of gear clutches 210) optionally engaged with a first shaft (e.g., first shaft 254) of a first electric machine (e.g., first electric motor 200) versus time. The first clutch of the first set of gear clutches herein described may either be engaged or disengaged. When trace 602 is at a lower level that is near the horizontal axis, the first clutch of the first set of gear clutches is in the disengaged state. When trace 602 is at a higher level that is near the vertical axis arrow, the first clutch of the first set of gear clutches is in the engaged state. Trace 602 represents the state of the first clutch of the first set of gear clutches. The state of the first clutch of the first set of gear clutches may be asserted via an actuator of a control system of the transmission system.

The second plot from the top of FIG. 6 is a plot of a state of a first clutch of a second set of gear clutches (e.g., first dog clutch 228 of the second set of gear clutches 212) optionally engaged with a second shaft (e.g., second shaft 234) of a second electric machine (e.g., second electric motor 202) versus time. The first clutch of the second set of gear clutches herein described may either be engaged or disengaged. When trace 604 is at a higher level that is near the vertical axis arrow, the first clutch of the second set of gear clutches is in the engaged state. When trace 604 is at a lower level that is near the horizontal axis, the first clutch of the second set of gear clutches is in a disengaged state. Trace 604 represents the state of the first clutch of the second set of gear clutches. The state of the first clutch of the second set of gear clutches may be asserted via an actuator of a control system of the transmission system.

The third plot from the top of FIG. 6 is a plot of a state of a second clutch of the first set of gear clutches (e.g., second dog clutch 252 of the first set of gear clutches 210) optionally engaged with a first shaft (e.g., first shaft 254) of a first electric machine (e.g., first electric motor 200) versus time. The second clutch of the first set of gear herein described may either be engaged or disengaged. When trace 606 is at a higher level that is near the vertical axis arrow, the second clutch of the first set of gear is in the engaged state. When trace 606 is at a lower level that is near the horizontal axis, the second clutch of the first set of gear is in a disengaged state. Trace 606 represents the state of the second clutch of the first set of gear. The state of the second of the first set of gear clutch may be asserted via an actuator of a control system of the transmission system.

The fourth plot from the top of FIG. 6 is a plot of a state of a second clutch of the second set of gear clutches (e.g., second dog clutch 232 of the second set of gear clutches 212) optionally engaged with a second shaft (e.g., second shaft 234) of a second electric machine (e.g., second electric motor 202) versus time. The second clutch of the second set of gear clutches herein described may either be engaged or disengaged. When trace 608 is at a higher level that is near the vertical axis arrow, the second clutch of the second set of gear clutches is in the engaged state. When trace 608 is at a lower level that is near the horizontal axis, the second clutch of the second set of gear clutches is in a disengaged state. Trace 608 represents the state of the second clutch of the second set of gear clutches. The state of the second clutch of the second set of gear clutches may be asserted via an actuator of a control system of the transmission system.

The fifth plot from the top of FIG. 6 is a plot of the state of a first PTO clutch (e.g., first PTO clutch 274) optionally engaged with a first shaft (e.g., first shaft 254) of a first electric machine (e.g., first electric motor 200) versus time. The first PTO clutch herein described may either be engaged or disengaged. When trace 610 is at a higher level that is near the vertical axis arrow, the first PTO clutch is in an engaged state. When trace 610 is at a lower level that is near the horizontal axis, the first PTO clutch is in a disengaged state. Trace 610 represents the state of the first PTO clutch. The state of the first PTO clutch may be asserted via an actuator of a control system of the transmission system.

The sixth plot from the top of FIG. 6 is a plot of the state of a second PTO clutch (e.g., second PTO clutch 292) optionally engaged with a second shaft (e.g., second shaft 234) of a second electric machine (e.g., second electric motor 202) versus time. The second PTO clutch herein describe may either be engaged or disengaged. When trace 612 is at a higher level that is near the vertical axis arrow, the second PTO clutch is in an engaged state. When trace 612 is at a lower level that is near the horizontal axis, the second PTO clutch is in a disengaged state. Trace 612 represents the state of the second PTO clutch. The state of the second PTO clutch may be asserted via an actuator of a control system of the transmission system.

The seventh plot from the top of FIG. 6 is a plot of the speed of a first electric machine (e.g., first electric motor 200) and a second electric machine (e.g., second electric motor 202) versus time. The speed of either motor may be high, low, high reverse, or low reverse zero. Trace 614 represents the speed of the first electric machine and trace 616 represents the speed of the second electric machine. When trace 614 is at a higher level that is near the vertical axis arrow, the speed of the first electric machine is high. When trace 616 is at a higher level that is near the vertical axis arrow, the speed of the second electric motor is high. When trace 614 is at a lower level that is near the horizontal axis, the speed of the first electric machine is low reverse. When trace 616 is at a lower level that is near the horizontal axis, the speed of the second electric machine is low reverse. When trace 614 is at a level between the higher level and the lower level, closer to the higher level than the lower level, the speed of the first electric machine is low. When trace 616 is at a level between the higher level and the lower level, closer to the higher level than the lower level, the speed of the second electric machine is low. When trace 614 is at a level between the higher level and the lower level, closer to the lower level than the higher level, the speed of the first electric machine is high reverse. When trace 616 is at a level between higher level and the lower level, the closer to the lower level than the higher level, the speed of the second electric machine is high reverse. The speed of both electric machines may be asserted via an actuator of a control system.

The eighth plot from the top of FIG. 5 is a plot of the torques of the first electric machine (e.g., first electric motor 200) and the second electric machine (e.g., second electric motor 202) versus time. The torque of either motor may be zero, a value greater than zero, or increased, meaning a peak performance torque. Trace 618 represents the torque of the first electric machine and trace 620 represents the torque of the second electric machine. When trace 618 is at a higher level that is near the vertical axis arrow, the torque of the first electric machine is increased. When trace 620 is at a higher level that is near the vertical axis arrow, the torque of the second electric motor is increased. When trace 618 is at a lower level that is near the horizontal axis, the torque of the first electric machine is zero. When trace 620 is at a lower level that is near the horizontal axis, the torque of the second electric machine is zero. When trace 618 is at a level between the higher level and the lower level (e.g., in the middle of the vertical axis), the torque of the first electric machine is the value greater than zero. When trace 620 is at a level between the higher level and the lower level (e.g., in the middle of the vertical axis), the torque of the second electric machine is the value greater than zero. The torque of both electric machines may be asserted via an actuator of a control system.

At time t0, the first clutch of the first set of gear clutches is disengaged and the first clutch of the second set of gear clutches is engaged, both second clutches are disengaged, the first PTO clutch is engaged and the second PTO clutch is disengaged, the speed of the first electric machine is high and the speed of the second electric machine is low reverse. Time t0 represents a fifth mode of the transmission system (e.g., the fifth mode detailed with respect to FIG. 3A). Between times t0 and t1, the speed of the first electric machine decreases from high to low. At time t1, the second PTO clutch transitions from disengaged to engaged. Between times t1 and t2, the torque of the first electric machine is decreased to zero and the torque of the second electric machine is increased to a peak performance torque. At time t2, the first PTO clutch transitions from engaged to disengaged. Between times t2 and t3, the speed of the first electric machine transitions from low to low reverse. At time t3, the first clutch of the first set of gear clutches transitions from disengaged to engaged. Between times t3 and t4, the torque of the first electric machine increases from zero to the value greater than zero and the torque of the second electric machine decreases from increased to the value greater than zero. Then, the speed of both the first and second electric machines increases from low reverse to high reverse. Time t4 represents a sixth mode of the transmission (e.g., the sixth mode detailed with respect to FIG. 3A). Between times t4 and t5, the torque of the second electric machine is increased to a peak performance torque and the torque of the first electric machine decreases to zero. At time t5, the first clutch of the first set of gear clutches transitions from engaged to disengaged. Between times t5 and t6, the speed of the first electric machine decreases from high reverse to low reverse. At time t6, the second clutch of the first set of gear clutches transitions from disengaged to engaged. Between times t6 and t7, the torque of the first electric machine increases from zero to a peak performance torque and the torque of the second electric machine decreases from a peak performance torque to zero (e.g., a powershifting transient). At time t7, the first clutch of the second set of gear clutches transitions from engaged to disengaged. Between times t7 and t8, the speed of the second electric machine decreases from high reverse to low reverse and then the second clutch of the second set of gear clutches transitions from disengaged to engaged. Time t8 represents a seventh mode of the transmission (e.g., the seventh mode detailed with respect to FIG. 3A). It will be understood that the specific clutch control strategy may be more nuanced, in practice. For instance, clutch pressure may be less abruptly ramped up to allow a smoother transition into the second gear to occur and reduce the likelihood of unwanted noise, vibration, and harshness (NVH).

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The disclosure also provides support for a transmission system, comprising: a first electric machine rotationally coupled to a first shaft, a first set of gear clutches coupled the first shaft, a second electric machine rotationally coupled to a second shaft, a second set of gear clutches coupled to the second shaft, and a first power take-off (PTO) clutch coupled to the first shaft and including a first gear that is rotationally coupled to a second gear that is coupled to an input shaft of a PTO. In a first example of the system, the system further comprises: a second PTO clutch coupled to the second shaft and including a third gear that meshes with a fourth gear, wherein the fourth gear is coupled to a layshaft and is rotationally coupled to the second gear. In a second example of the system, optionally including the first example, the system further comprises: a controller including instructions stored in non-transitory memory that when executed, during reverse drive operation, cause the controller to: engage one of the first and second PTO clutches and disengage the other one of the first and second PTO clutches. In a third example of the system, optionally including one or both of the first and second examples, the first gear meshes with the second gear and the fourth gear meshes with the second gear. In a fourth example of the system, optionally including one or more or each of the first through third examples, the first and second sets of gear clutches each include a first gear clutch and a second gear clutch. In a fifth example of the system, optionally including one or more or each of the first through fourth examples, the system further comprises: a controller including instructions stored in non-transitory memory that when executed cause the controller to: shift between a first operating gear and a second operating gear while the first PTO clutch is engaged. In a sixth example of the system, optionally including one or more or each of the first through fifth examples, each of the first and second clutches in the first and second sets of gear clutches include gears that mesh with gears on an output shaft. In a seventh example of the system, optionally including one or more or each of the first through sixth examples, the system further comprises: a controller including instructions stored in non-transitory memory that when executed cause the controller to: selectively engage the first PTO clutch based on a drive mode of the transmission system, the drive mode includes a forward drive mode and a reverse drive mode. In an eighth example of the system, optionally including one or more or each of the first through seventh examples, the PTO is a hydraulic pump. In a ninth example of the system, optionally including one or more or each of the first through eighth examples, the first electric machine and the second electric machine are traction motor-generators.

The disclosure also provides support for a method for operation of a transmission system, comprising: selectively delivering mechanical power to a PTO via selective engagement of a first power take-off (PTO) clutch based on a drive mode of the transmission system, wherein the transmission system includes: a first electric machine rotationally coupled to a first shaft, a first set of gear clutches coupled the first shaft, a second electric machine rotationally coupled to a second shaft, and a second set of gear clutches coupled to the second shaft. In a first example of the method, the transmission system further comprises a second PTO clutch coupled to the second shaft, wherein the method further comprises selectively delivering mechanical power to the PTO via selective engagement of the second PTO clutch based on the drive mode of the transmission system. In a second example of the method, optionally including the first example, selectively engaging the second PTO clutch includes engaging or sustaining engagement of the second PTO clutch during reverse drive operation, and selectively engaging the first PTO clutch includes disengaging or sustaining disengagement of the first PTO clutch during reverse drive operation. In a third example of the method, optionally including one or both of the first and second examples, selectively engaging the second PTO clutch includes engaging or sustaining engagement of the second PTO clutch during a powershifting transient, and selectively engaging the first PTO clutch includes disengaging or sustaining disengagement of the first PTO clutch during the powershifting transient. In a fourth example of the method, optionally including one or more or each of the first through third examples, each of the clutches in the first and second sets of gear clutches are dog clutches.

The disclosure also provides support for an electric drive transmission, comprising: a first traction motor rotationally coupled to a first shaft, a first pair of gear clutches coupled the first shaft, a second traction motor rotationally coupled to a second shaft, a second pair of gear clutches coupled to the second shaft, a first power take-off (PTO) clutch coupled to the first shaft, a second PTO clutch coupled to the second shaft, and a controller including instructions stored in non-transitory memory that when executed, during reverse drive operation or a powershifting transient, cause the controller to: operate the first and second PTO clutches to deliver mechanical power to a PTO. In a first example of the system, operating the first and second PTO clutches includes disengaging or sustaining disengagement of the first PTO clutch and engaging or sustaining engagement of the second PTO clutch. In a second example of the system, optionally including the first example, the first and second PTO clutches are synchronizers. In a third example of the system, optionally including one or both of the first and second examples, each of the clutches in the first and second pairs of gear clutches are synchronizers. In a fourth example of the system, optionally including one or more or each of the first through third examples, an output is driven either by a combined torque from both the first and second traction motors or by one of the first or second traction motors alone.

The invention claimed is:

1. A transmission system, comprising:
a first electric machine rotationally coupled to a first shaft;
a first set of gear clutches coupled the first shaft, wherein the first set of gear clutches comprises a first gear clutch and a second gear clutch;
a second electric machine rotationally coupled to a second shaft;
a second set of gear clutches coupled to the second shaft, wherein the second set of gear clutches comprises a third gear clutch and a fourth gear clutch; and
a power take-off (PTO) gear arrangement comprising a first PTO gear set including a first gear coupled to a first PTO clutch that is selectively coupled to the first shaft, wherein the first gear meshes with a second gear of the PTO gear arrangement, the second gear being rotationally coupled to an input shaft of a PTO.

2. The transmission system of claim 1, wherein the PTO gear arrangement further comprises a second PTO gear set including a third gear meshed with a fourth gear, wherein the third gear is coupled to a second PTO clutch that is selectively coupled to the second shaft and wherein the fourth gear is meshed with the second gear.

3. The transmission system of claim 2, further comprising a controller including instructions stored in non-transitory memory that when executed, during reverse drive operation, cause the controller to:
engage one of the first and second PTO clutches and disengage the other one of the first and second PTO clutches.

4. The transmission system of claim 2, wherein the first gear meshes with the second gear and the fourth gear meshes with the second gear.

5. The transmission system of claim 1, further comprising a controller including instructions stored in non-transitory memory that when executed cause the controller to:
shift between a first operating gear and a second operating gear while the first PTO clutch is engaged.

6. The transmission system of claim 1, wherein each of the first and second gear clutches mesh with an output shaft via gears thereof.

7. The transmission system of claim 1, further comprising a controller including instructions stored in non-transitory memory that when executed cause the controller to:
selectively engage the first PTO clutch based on a drive mode of the transmission system, the drive mode includes a forward drive mode and a reverse drive mode.

8. The transmission system of claim 1, wherein the PTO is a hydraulic pump.

9. The transmission system of claim 1, wherein the first electric machine and the second electric machine are traction motor-generators.

10. A method for operation of a transmission system, comprising:
selectively delivering mechanical power to a PTO via selective engagement of a first power take-off (PTO) clutch based on a drive mode of the transmission system, wherein the transmission system includes:
a first electric machine rotationally coupled to a first shaft;
a first set of gear clutches coupled the first shaft, the first set of gear clutches comprising a first gear clutch and a second gear clutch;
a second electric machine rotationally coupled to a second shaft; and
a second set of gear clutches coupled to the second shaft, the second set of gear clutches comprising a third gear clutch and a fourth gear clutch, wherein the first PTO clutch selectively engages the first shaft and is coupled to a first gear that meshes with a second gear, wherein the second gear rotationally couples to a PTO shaft coupled to the PTO.

11. The method of claim 10, wherein the transmission system further comprises a second PTO clutch coupled to the second shaft, wherein the method further comprises selectively delivering mechanical power to the PTO via selective engagement of the second PTO clutch based on the drive mode of the transmission system.

12. The method of claim 11, wherein:
selectively engaging the second PTO clutch includes engaging or sustaining engagement of the second PTO clutch during reverse drive operation; and
selectively engaging the first PTO clutch includes disengaging or sustaining disengagement of the first PTO clutch during reverse drive operation.

13. The method of claim 11, wherein:
selectively engaging the second PTO clutch includes engaging or sustaining engagement of the second PTO clutch during a powershifting transient; and
selectively engaging the first PTO clutch includes disengaging or sustaining disengagement of the first PTO clutch during the powershifting transient.

14. The method of claim 10, wherein each of the first, second, third, and fourth clutches of the first and second sets of gear clutches are dog clutches.

15. An electric drive transmission, comprising:
a first traction motor rotationally coupled to a first shaft;
a first pair of gear clutches coupled the first shaft, wherein the first pair of gear clutches comprises a first gear clutch comprising a first gear and a first dog clutch and a second gear clutch comprising a second gear and a second dog clutch;
a second traction motor rotationally coupled to a second shaft;
a second pair of gear clutches coupled to the second shaft, wherein the second pair of gear clutches comprises a third gear clutch comprising a third gear and a third dog clutch and a fourth gear clutch comprising a fourth gear and a fourth dog clutch;
a first power take-off (PTO) clutch selectively coupled to the first shaft;
a second PTO clutch selectively coupled to the second shaft; and
a controller including instructions stored in non-transitory memory that when executed, during reverse drive operation or a powershifting transient, cause the controller to:
operate the first and second PTO clutches to deliver mechanical power to a PTO.

16. The electric drive transmission of claim 15, wherein operating the first and second PTO clutches includes disengaging or sustaining disengagement of the first PTO clutch and engaging or sustaining engagement of the second PTO clutch.

17. The electric drive transmission of claim 15, wherein the first and second PTO clutches are synchronizers.

18. The electric drive transmission of claim 17, wherein each of the clutches in the first and second pairs of gear clutches are synchronizers.

19. The electric drive transmission of claim 15, wherein an output is driven either by a combined torque from both the first and second traction motors or by one of the first or second traction motors alone.

* * * * *